Patented Sept. 21, 1943

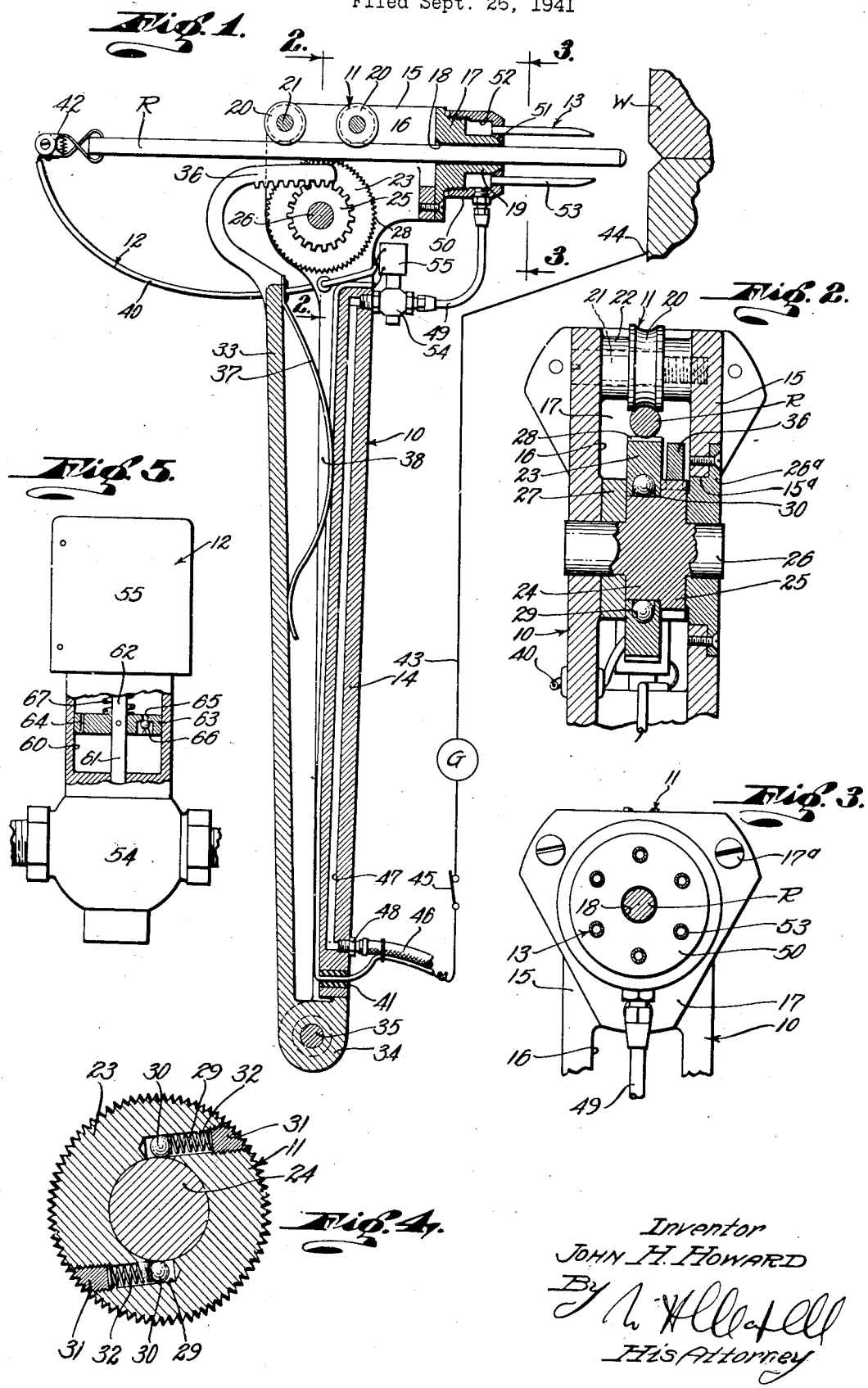

2,329,904

UNITED STATES PATENT OFFICE 2,329,904

APPARATUS FOR WELDING

John H. Howard, Whittier, Calif.

Application September 26, 1941, Serial No. 412,375

2 Claims. (Cl. 219—8)

This invention relates to a device useful in welding and it is a general object of the invention to provide a simple, practical and effective tool or device for welding.

Another object of this invention is to provide a tool or device for welding, by means of the electric arc method, which carries the welding material or rod, has means for creating the welding arc and means for maintaining a non-oxidizing atmosphere at the zone of welding operations. In accordance with the present invention, the device or tool supports the welding rod in such a way that the rod is conveniently and accurately presented to the work and has controllable means for creating the welding arc and for maintaining the non-oxidizing atmosphere of hydrogen or the like and, therefore, constitutes a complete unitary tool.

Another and important object of the invention is to provide a tool or device of the character referred to in which the welding rod, wire, or the like, forms one electrode and the work constitutes the other electrode so that the arc is created between the work itself and the welding rod. This is of great importance as it permits the creation of the welding arc in inaccessible parts of the work and presents the welding rod directly to the arc and work. This feature also eliminates the necessity for spaced opposed electrodes on the tool which prevent access to remote inaccessible places and which often greatly interfere with the welding operations.

Another object of this invention is to provide a welding tool which carries the welding wire or rod and embodies effective means for advancing the same as the welding operations progress.

Another object of this invention is to provide a welding tool which engages and directs the welding rod at a point adjacent the work and embodies a convenient handle so that the welder always has full control over the tool and rod and may readily control the tool and direct the rod without the necessity of directly engaging and manipulating the rod as a separate part.

A further object of this invention is to provide a welding device of the character mentioned embodying a safety control which prevents the delivery of the hydrogen, or other gas employed, except when the welding arc is present between the work and the welding rod, thus preventing the discharge of excessive gas and eliminating the resultant danger. The safety control embodied in the invention prevents premature delivery of gas prior to the formation of the arc and prevents a long continued discharge of the gas subsequent to termination of the arc but permits a continued discharge when there are only momentary or temporary interruptions in the welding arc.

The various objects and features of my invention will be fully understood from the following detailed description of a typical preferred form and application of the invention, throughout which description reference is made to the accompanying drawing, in which:

Fig. 1 is a central vertical detailed sectional view of the device or tool provided by this invention with a schematic wiring diagram of the circuit involved. Fig. 2 is an enlarged fragmentary vertical detailed sectional view taken as indicated by line 2—2 on Fig. 1. Fig. 3 is an enlarged vertical detailed sectional view taken as indicated by line 3—3 on Fig. 1. Fig. 4 is an enlarged vertical detailed sectional view of the one-way drive embodied in the rod feeding mechanism and Fig. 5 is an enlarged fragmentary sectional view of the electric valve means with certain parts in elevation.

It is believed that the mode of operation of the invention will be better understood following a detailed description of the device. Accordingly, I will proceed with a detailed disclosure of a typical illustrative tool or device made in accordance with the invention.

The embodiment of the invention illustrated in the drawing may be said to comprise, generally, a body 10, means 11 on the body 10 for supporting, directing and advancing a welding wire or rod R, means 12 whereby an electric arc may be generated between the rod R and the work W and means 13 for maintaining a non-oxidizing atmosphere at the arc.

The body 10 carries the principal elements of the device and, in accordance with the invention, is formed and proportioned to be readily carried and manipulated by the workman or welder. In the illustrative form of the invention herein disclosed the body 10 comprises an elongate handle 14 and a head 15 on the outer end of the handle. The handle 14 and head 15 may or may not be integral, as desired. The handle 14 is formed and proportioned to be readily grasped in the hand of the welder and, as illustrated, may be of substantial length. The head 15 occurs at what may be termed the upper or outer end of the handle 14 and extends both forwardly and rearwardly from the handle. The head 15 is split or bifurcated having a central vertical slot 16 extending into it from its rear end. The slot 16 terminates before reaching the forward end of the head 15 leaving a forward wall 17 but may continue downwardly into the upper portion of the handle 14. In the particular form of the invention illustrated, the wall 17 is a separately formed part secured to the head 15 by screws 17ª. It will be observed that the body 10 may be a simple light weight structure.

The means 11 for supporting and advancing the welding rod R is a feature of the invention as it greatly facilitates the manual operations involved in the welding. The tool provided with the means 11 gives the workman full control over the rod R and makes it unnecessary to directly grip the rod or to change the position of his hand as the rod is advanced as a result of the welding operations. The means 11 includes structure at the head 15 for guiding and directing the wire or rod R. This means or structure may take the form of a rather long generally horizontal opening 18 in the wall 17. The opening 18 extends through the wall 17 and continues forwardly through a boss 19 on the front of the wall. The rear portion of the opening 18 may be flared or tapered to facilitate the insertion of the welding rod R. The rod R passes rearwardly through the slot 16 and may extend rearwardly beyond the head 15. While I have shown the rod R as a rigid member, it is to be understood that it may be in the form of a wire wound on a conveniently located reel and trained to extend to the tool. It will be observed that the welding rod R extends transversely of the outer end of the handle 14 to be accurately located and directed by the workman grasping the handle.

The means 11 for supporting and advancing the rod R further includes a rod feeding mechanism. This mechanism includes spaced guide rollers 20 supported in the slot 16. The rollers 20 are supported on horizontally spaced shafts or screws 21 passing through the slot 16 and supported by the walls of the head 15. The rollers 20 are positioned and related to the opening 18 to have cooperation with the upper side of the rod R at points spaced longitudinally along the rod. The peripheries of the rollers 20 are preferably grooved to have effective guiding engagement with the rod. Spacers 22 on the shafts or screws 21 centrally space the rollers 20 between the walls of the slot 16.

The rod advancing wheel 23 is mounted in the slot 16. The wheel 23 is arranged below the rod R and preferably has its axis of rotation spaced between the planes occupied by the axes of the rollers 20. In the drawing I have shown the advancing wheel 23 rotatably supported on the hub 24 of a gear 25. The gear 25 has trunnions or stub shafts 26, one of which is rotatably supported in an opening in the side of the head 15 and the other of which is rotatably supported in an opening in a removable plate 26ª normally closing an opening 15ª in a wall of the head. The opening 15ª is provided to facilitate the assembling of the various elements in the slot 16. A spacer 27 on the adjacent shaft 26 holds the gear 25 against end play and retains the wheel 23 on the hub 24. The periphery of the wheel 23 is knurled or provided with teeth 28 to have effective driving or advancing cooperation with the rod R.

The means for advancing the rod R further includes a manually operable actuating means or drive for the advancing wheel 23. The operator's hand grasping the handle 14 may be employed to intermittently rotate the wheel 23 for the purpose of advancing the rod R as the welding operation progresses. The mechanism for rotating the wheel 23 includes a ratchet drive or one-way drive between the gear 25 and the wheel 23. This one-way drive may take various forms and the invention is not to be considered as restricted to the specific form of one-way drive shown. The one-way drive illustrated in the drawing comprises a plurality of bores or openings 29 formed in the wheel 23 to be tangential to the periphery of the hub 24 and to have their sides open at the interior of the wheel 23. Balls 30 are arranged in the tangential opening 29 to cooperate with the gear hub 24. Plugs 31 close the outer ends of the openings 29 and springs 32 may be arranged between the plugs 31 and the balls 30 to urge the balls inwardly. Upon rotation of the gear 25 in one direction the balls 30 grip or frictionally engage the hub 24 so that the wheel 23 rotates with the gear while upon rotation of the gear 25 in the other direction the hub 24 merely rides past the balls 30 without producing rotation of the wheel 23.

A rack lever 33 is associated with the handle 14 for operating or rotating the gear 25. The lever 33 is arranged at the rear edge or side of the handle 14 and is pivotally connected with the handle. In the illustrative arrangement disclosed in the drawing, there are overlapping hinge parts 34 formed on the lower ends of the handle 14 and lever 33 and a hinge pin or pivot pin 35 passes through openings in these parts to pivotally secure the lever to the handle. A rack 36 is secured to or formed on the upper end of the lever 33 to have toothed engagement with the gear 25. The rack 36 operates forwardly and rearwardly in the slot 16 upon operation of the lever 33. The parts are constructed so that forward pivotal movement of the lever 33 results in forward advancement of the rod R, that is, the gear 25 and rack 36 and the ratchet means or one-way drive are constructed to produce advancement of the rod R upon forward pivoting of the lever 33. Return movement of the lever 33, that is, rearward movement of the lever does not result in movement of the rod R because the hub 24 merely rides past the balls 30 without transmitting movement to the wheel 23.

Means is preferably provided for restoring or returning the lever 33. This means may take the form of a bowed leaf spring 37 engaged between the lever 33 and the handle 14. In the drawing I have shown the spring 37 secured to the upper portion of the lever 33 to have its bowed intermediate portion bear forwardly against the handle 14. The handle 14 may be provided with a longitudinal groove 38 for receiving the spring 37 to assist in retaining and stabilizing the spring.

The means 12 supplies current to the rod R and the work W so that an electric arc is formed between the end of the rod and the work W when the rod is brought into proximity to the work. The means for connecting the rod R and the work W in the welding circuit may, of course, vary greatly without departing from the spirit of the invention. As illustrated, the means 12 comprises an insulated conductor or lead 40 received in an insulated opening 41 in the handle 14 and extending outwardly through the groove 38 of the handle. The lead 40 continues outwardly or rearwardly beyond the head 15 and its end is provided with a clip 42, or the equivalent, to facilitate its removable connection with the rod R. The lead 40 extends from the device or tool to a suitable generator G or other equivalent source of electrical energy of suitable amperage. The other line 43 from the source or generator G extends to the work W and is electrically joined or connected with the work at 44. The lead 43 may be electrically attached to the work W in any preferred or selected manner. A control switch 45 is interposed in the welding circuit at a selected point.

The means 13 is operable to maintain an inert or non-oxidizing atmosphere at the zone of welding operations. It is a feature of the invention that the means 13 is under the control of the current supplying means 12. The means 13 includes a hose 46 or other conductor of the selected gas leading from a source of hydrogen or other suitable gas under pressure, not shown, to a port 47 in the handle 14. The port 47 may have a fitting 48 adjacent the rear end of the handle 14 for receiving the hose 46. The port 47 leads outwardly through the handle 14 and may extend to the forward end of the head 15. In the example illustrated, however, the port 47 terminates below the head 15 and a hose 49 continues outwardly to a cap 50 threaded on the wall 17. The cap 50 has a central tapered opening 51 in its outer end wall receiving the tapered end of the boss 19. This structure provides a seal at the outer end of the boss 19 and leaves an annular chamber 52 in the cap. One or a plurality of nozzles or jets 53 is provided on the cap to discharge the gas toward the end of the rod R and the work W. In the construction illustrated there is an annular series of jets 53 set in openings in the outer wall of the cap 50 to communicate with the chamber 52 and to project forwardly beyond the cap. The outer portions of the jets 53 may be inwardly and forwardly convergent to concentrate the gas at the welding arc.

The gas line to the jet chamber 52 is under the control of a valve 54, which in turn is governed by the means 12. The valve 54 may be connected in the port and hose system of the means 13 at any point, for example, it may be provided in the body 10 to govern the port 47. In the embodiment of the invention illustrated, the valve 54 is interposed between the outer end of the port 47 and the hose 49 having a fitting secured in the outer end of the port and having a fitting receiving the hose 49. The valve 54 is of any suitable form or type capable of effective operation by a solenoid coil 55. The valve operating coil 55 is interposed in the conductor or lead 40, that is, the lead 40 is interrupted and has its spaced parts connected with the terminals of the coil 55. The valve and coil combination is such that the valve 54 is closed when the coil 55 is idle or deenergized and the valve 54 is opened upon energization of the coil 55. It will be seen that when the welding arc is produced between the end of the rod R and the work W that a circuit is completed through the leads 40 and 43 and upon the completion of this circuit the coil 55 is energized to open the valve 54. However, when there is no welding arc the coil is deenergized.

The invention provides a time delay means associated with the valve 54 to prevent closing of the valve when the welding arc is only momentarily interrupted or extinguished. The time delay is such that the valve 54 is not closed and opened each time there is a momentary breaking of the welding arc and is such that the delivery of the hydrogen continues for a selected short period following extinguishment of the welding arc. The time delay means includes a chamber 60 associated with the valve 54. The stem 61 of the valve 54 enters or passes through the chamber 60. In the case illustrated, the valve stem 61 is operatively connected with the stem or armature 62 of the coil 55 at a dash pot piston or plunger 63. The plunger 63 slidably seals with the wall of the chamber 60. A port 64 of limited capacity extends through the plunger 63 to allow for the slow displacement of fluid or gas from one side of the plunger to the other. A larger port 65 is formed through the plunger 63 and is under the control of a ball check valve 66. The valve 66 is arranged to open to permit a free flow of fluid through the large port 65 when the plunger 63 and valve stem 61 move in the direction to open the valve 54. The check valve 66 closes or is held closed to prevent the flow of fluid through the port 65 when the plunger moves in the direction to close the valve 54. Thus, during closing movement of the plunger 63 and stem 61 fluid is obliged to pass through the small port 64. The port 64 may be proportioned to cause the valve 54 to close any selected time following deenergization of the coil 55. A spring 67 may react against the plunger 63 to close or to assist in closing the valve 54 upon deenergization of the coil 55. The port 64 and the spring 67 may be formed and proportioned so that it required a given or selected time for the valve 54 to close following deenergization of the coil 55. In practice, this time delay necessary for closing of the valve 54 may be about thirty seconds. With the structure just described the delivery of the hydrogen gas to the point of the weld is not terminated until, say thirty seconds, following the extinguishment of the welding arc. In the welding work there may be times when the welding arc is temporarily or momentarily interrupted and when this occurs the time delay means, just described, prevents such momentary interruptions of the arc from affecting the valve 54 and there is a continuous delivery of the hydrogen gas to the weld.

It is believed that the operation of the apparatus will be readily understood from the foregoing detailed description. With the line 40 connected with the rod R and the line 43 connected with the work W and with the hose 46 in communication with a source of the selected gas under pressure, the device is in condition for use. The operator grasping the handle 14 has full control over the rod R and may bring the rod R to a position where its end is in close proximity to a part of the work W. When this is done, an arc occurs between the rod R and the work W, which arc produces the well known welding effect. Simultaneously with the formation of the arc the coil 55 is energized and opens the valve 54 so that the gas under pressure is delivered to the jets 53 and discharges at the zone of welding to maintain the inert or non-oxidizing atmosphere at the weld. As the welding operation progresses the rod R is used up. The operator may readily advance the rod R, as used, by merely tightening his grip upon the handle 14 to pivot the lever 33 forwardly. This forward pivoting of the lever 33 results in turning of the gear 25 and the wheel 23. The toothed wheel 23 advances the rod R. When the welder's grip on the lever 33 is relaxed the spring 37 restores the lever 33 and the gear 25 is turned in the opposite direction. However, this reverse rotation is not transmitted to the wheel 23, the hub 24 merely riding free on the balls 30. The operator or welder has no difficulty whatever in supporting the rod R or in advancing the rod as necessary. It is to be observed that the gas is discharged only when there is a welding arc present and, for this reason, there can never be an unintentional, excessive or continued discharge of the gas.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A device useful in welding and adapted to be carried and manipulated by the welder, the device comprising a body having a handle and a head, means on the head for carrying a welding rod, a welding circuit including a lead for connection with the rod and a lead for connection with the work whereby a welding arc may be formed between the rod and work, means for supplying a gas to the zone of the arc including a discharge means at the head and a gas conducting means leading to the discharge means, and means controlled by the welding circuit for controlling said conducting means comprising an electrically operated valve on the body for the conducting means connected in said circuit, and time delay means for delaying closing of the valve.

2. A device useful in welding and adapted to be carried and manipulated by the welder, the device comprising a body having a handle and a head, means on the head for carrying a welding rod, a welding circuit including a lead for connection with the rod and a lead for connection with the work whereby a welding arc may be formed between the rod and work, means for supplying a gas to the zone of the arc including a discharge means at the head and a gas conducting means leading to the discharge means, and means controlled by the welding circuit for controlling said conducting means comprising an electrically operated valve on the body for the conducting means connected in said circuit, and dash-pot means permitting free opening of the valve and delaying closing of the valve.

JOHN H. HOWARD.